UNITED STATES PATENT OFFICE.

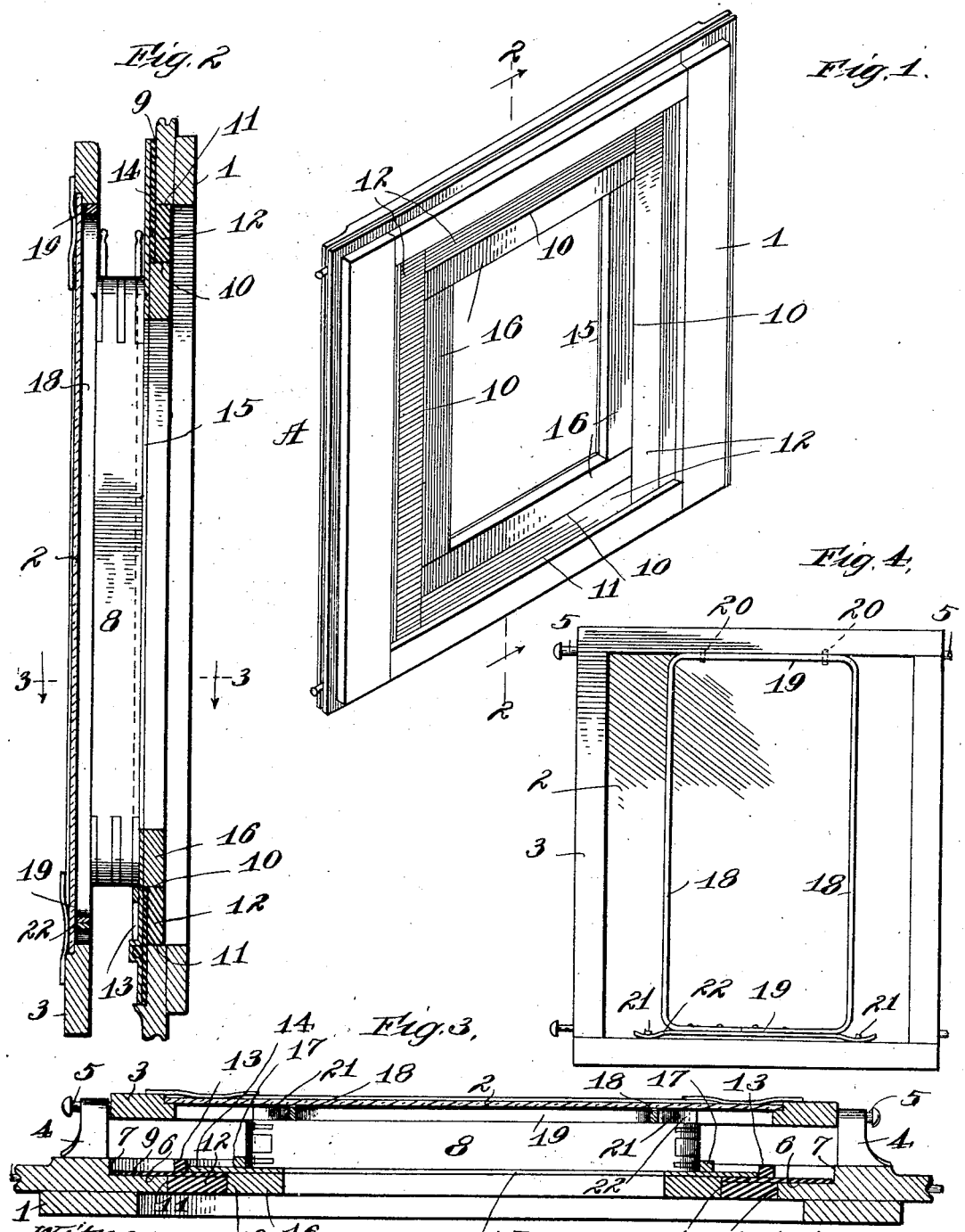

ASA W. STRAIGHT, OF CHICAGO, ILLINOIS.

CAMERA.

No. 927,897.      Specification of Letters Patent.      Patented July 13, 1909.

Application filed May 27, 1907. Serial No. 375,788.

*To all whom it may concern:*

Be it known that I, ASA W. STRAIGHT, a citizen of the United States, and a resident of Chicago, in the county of Cook and State of Illinois, have invented certain new and useful Improvements in Cameras, of which the following is a specification.

This invention relates to photographic cameras.

In taking photographs, it frequently happens that it is desired to make photographs of different sizes with the same camera. So far as I am aware, this has, heretofore, always been accomplished either by using a separate full sized back for each different size of plate holder, or by using plate holders of uniform size, the same being the full size for which the camera is designed, and providing means in connection therewith for supporting smaller sized plates or negatives therein. One means for this purpose heretofore in common use are what are known to the trade as "kits", consisting of frames adapted to fit into the plate holder and provided with openings of the size of the negatives desired, into which the sensitized plates of smaller size are secured by any suitable means, as many kits being required as it is desired to take different sizes of photographs. Various other devices are also used for this same purpose, but it is unnecessary to refer to these further than to say that where a camera is used for taking a photograph smaller than that for which it is especially designed, it is always necessary to use a full size plate holder. Thus, even when taking smaller sized photographs, it is necessary to carry around as many plate holders of full size as are required for taking a desired number of photographs. Now the sizes of negatives or plates will be as the squares of the relative sizes of pictures which it is desired to take. Thus, to take a photograph three times as large as another, will require a plate nine times the size or area of the plate used for taking the first picture, and to take a picture one-fourth as large as another, will only require a plate one-sixteenth the size. The plate holders will, of course, have to be made correspondingly larger or smaller, so that, speaking generally, the bulk and weight of the plate holders will vary as the squares of the relative sizes of the plates for which they are respectively adapted or designed to be used. Accordingly, when larger sized plate holders are used for taking photographs relatively small as compared with those for which the camera is primarily adapted, it will obviously be necessary to carry around a much greater load, both in bulk and weight, than would be necessary if holders, corresponding in size to different sizes of plates were used.

To use separate full sized backs for each size of plate holder renders an outfit even more bulky than the use of full sized plate holders.

The object of the invention is to overcome the foregoing objectionable feature, by providing a device, preferably adapted to be removably attached to a camera, whereby said camera is adapted for using plate holders of different sizes corresponding to the different sizes of photographs which it is desired to take, which will be of simple and cheap construction, strong and durable, and which will, practically, add nothing, either of bulk or weight, to said camera.

To this end my invention consists of the various features, combinations of features and details of construction hereinafter described and claimed.

In the accompanying drawings, in which my invention is fully illustrated—Figure 1 is a perspective front view of a camera back embodying my invention. Fig. 2 is an enlarged sectional view thereof on the line 2—2 of Fig. 1. Fig. 3 is an enlarged sectional view thereof on the line 3—3 of Fig. 2; and Fig. 4 is an elevation of the front side of a screen with a plate holder supporting attachment.

Referring now to the drawings, A designates, as a whole, the back of a camera, comprising a skeleton frame 1, adapted for removable attachment to the rear end of a camera, and a focusing screen 2 of ground glass secured in a suitable frame 3 yieldingly connected to said skeleton frame 1 by means of spring hooks 4 on said frame 1 adapted to engage pins 5 secured in the frame 3 of the focusing screen.

All of the foregoing elements, which are old and well known in the art, may be of any desired or approved construction and will be readily understood by those familiar with the art without a more detailed description thereof.

As is also well known, after the camera has been focused, the plate holder is inserted between the skeleton frame 1 and the focusing screen 2, the size thereof being such that the edges of said plate holder will be held between the frame 1 and the frame 3 of the focusing screen, the frame 1 being preferably rabbeted at the edges of the opening therein forming shoulders 6 and 7, of which the shoulders 6 define the location of the plate holder and thus of the plate therein, which is to receive the image, relatively to the lens of the camera and the shoulders 7 act both as guides for the plate holder in inserting the same into position and also to prevent access of light to the plate at the edges of the plate holder, between said plate holder and the frame 1. Obviously, if a plate holder, appreciably smaller than those for which the camera is designed were used, there would be no support for the same at its front side, or if a support were provided, the rear side of said plate holder would bear directly against the focusing screen 2, which would be very liable to be broken, sooner or later, by the pressure of the springs 4. For purposes of illustration, such a relatively small plate holder is shown in the drawings at 8.

To provide for using smaller plate holders in a camera than those for which it was primarily designed and adapted, I insert a plate 9 in the camera, the outer edges of which bear against the shoulders 6 on the rear side of the frame 1, and which is provided with a light opening 10 corresponding to the size of the photograph which it is desired to take. Formed on the front surface of the plate are shoulders 11 which fit closely into the opening in the frame 1 and which operate to support said plate 9 in proper position. As shown, the shoulders 11 are formed by the outer edges of strips 12, preferably of wood, secured to the front surface of said plate 9 with their inner edges flush with the edges of the opening 10 in said plate 9. Secured to the rear side of said plate 9 are strips 13, corresponding to the shoulders 7 on the frame 1, and which form guides for the plate holder and which also operate to prevent access of light to the sensitized plate around the edge of the plate holder.

If it is desired to use a still smaller plate holder, this can be done by removing the plate 9 and replacing the same with another plate of the same construction having a light opening 10 of desired size. In practice, however, I prefer to use a second plate 14 provided with a light opening 15 and strips 16, the outer edges of which form shoulders adapted to engage the edges of the opening 10 in the plate 9, and with guide strips 17 which define the position of the plate holder, all substantially identical with the corresponding elements of the plate 9. With this construction, the plates 9 and 14 will form what may be termed a nest and which may consist of any desired number of members by means of which any desired reduction may be obtained.

To prevent breaking of the focusing screen 2 by the pressure thereon of plate holders smaller than those for which the camera is designed, bars or rods 18 are secured to the frame 3 of the focusing screen 2 in such position that they will bear against the rear side of relatively small plate holders. In the preferable construction shown, the bars or rods 18 are connected at their ends by transverse members 19, so as to form an integral structure. As preferably constructed, also, said frame is made removable, so as not to interfere with the taking of larger sized photographs. As shown, said frame is secured in position in the following manner:—Secured in one side of the focusing screen 3, are pins 20 which are adapted to engage suitable holes in one of the transverse members 19, and secured in the opposite side of the focusing screen 3, are pins 21 which are likewise adapted to engage suitable holes in the opposite member 19.

To provide for engaging the pins 20 and 21 with their respective holes, a leaf spring 22 is secured to one of the members 19, in which the holes adapted to engage the pins 21 are directly formed, so that by compressing said spring 22 the pins 20 may be engaged with or disengaged from their holes in the member 19. Said spring 22 will also operate to prevent shaking and rattling of said supporting frame. Provision is thus made for removing the supporting rod 18 when taking full sized photographs, if desired, though it is believed that said supporting rods or bars will not interfere with the focusing of the camera, even for a full sized picture, and my invention therefore contemplates the use of bars or rods secured to the frame 3 of the focusing screen in fixed adjustment.

I claim:—

1. The combination with a camera back comprising a skeleton frame, a focusing screen, a frame therefor and springs connecting said skeleton frame and focusing screen frame, of a support for plate holders of smaller size than those for which the camera is primarily designed, comprising a removable plate provided with a light opening inserted at the back of said skeleton frame and rods or bars secured to the focusing screen frame at the front side of the focusing screen.

2. The combination with a camera back comprising a skeleton frame, a focusing screen, a frame therefor and springs connecting said skeleton frame and focusing screen frame, of a support for plate holders of smaller size than those for which the camera is primarily designed, comprising a removable plate provided with a light opening inserted at the back of said skeleton frame and rods or bars removably secured to the focusing screen frame at the front side of the focusing screen.

3. The combination with a camera back comprising a skeleton frame, a focusing screen, a frame therefor and springs connecting said skeleton frame and focusing screen frame, of a support for plate holders of smaller size than those for which the camera is primarily designed, comprising a removable plate provided with a light opening inserted at the back of said skeleton frame, shoulders on the front side of said plate adapted to fit the opening in said skeleton frame and rods or bars secured to the focusing screen frame at the front side of the focusing screen.

4. The combination with a camera back comprising a skeleton frame, a focusing screen, a frame therefor and springs connecting said skeleton frame and focusing screen frame, of a support for plate holders of smaller size than those for which the camera is primarily designed, comprising a removable plate provided with a light opening inserted at the back of said skeleton frame, plate holder guides on the rear side of said plate and rods or bars secured to the focusing screen frame at the front side of the focusing screen.

5. The combination with a camera back comprising a skeleton frame, a focusing screen, a frame therefor and springs connecting said skeleton frame and focusing screen frame, of a support for plate holders of smaller size than those for which the camera is primarily designed, comprising a removable plate provided with a light opening inserted at the back of said skeleton frame.

6. The combination with a camera back comprising a skeleton frame, a focusing screen, a frame therefor and springs connecting said skeleton frame and focusing screen frame, of a support for plate holders of smaller size then those for which the camera is primarily designed, comprising a removable plate provided with a light opening inserted at the back of said skeleton frame and shoulders on the front side of said plate adapted to fit the opening in said skeleton frame.

7. The combination with a camera back comprising a skeleton frame, a focusing screen, a frame therefor and springs connecting said skeleton frame and focusing screen frame, of a support for plate holders of smaller size than those for which the camera is primarily designed, comprising a removable plate provided with a light opening inserted at the back of said skeleton frame and plate holder guides on the rear side of said plate.

8. The combination with a camera back comprising a skeleton frame, a focusing screen, a frame therefor and springs connecting said skeleton frame and focusing screen frame, of a support for plate holders of smaller size than those for which the camera is primarily designed, comprising, as elements, connected rods or bars removably secured to the focusing screen frame at the front side of the focusing screen.

9. The combination with a camera back comprising a skeleton frame, a focusing screen, a frame therefor and springs connecting said skeleton frame and focusing screen frame, of a support for plate holders of smaller size than those for which the camera is primarily designed, comprising, as an element, a skeleton guard for the focusing screen secured to the focusing screen frame at the front side of the focusing screen comprising rigidly connected rods or bars, a spring secured to one end of said skeleton guard, the means for securing said guard in position comprising pins in the focusing screen frame adapted to engage holes in said spring and in the opposite end of said skeleton guard.

10. The combination in a camera, of a focusing screen and a plate holder supporting device comprising, as an element, a skeleton guard for the focusing screen secured over the front side of said screen.

11. The combination with a camera back comprising a skeleton frame, a focusing screen, a frame therefor and springs connecting said skeleton frame and focusing screen frame, of a support for plate holders of smaller size than those for which the camera is primarily designed, comprising a nest of plates inserted at the back of the skeleton frame, said plates being provided with successively smaller light openings corresponding to the different sizes of negatives it is desired to make.

In testimony, that I claim the foregoing as my invention, I affix my signature in presence of two subscribing witnesses, this 25th day of May, A. D. 1907.

ASA W. STRAIGHT.

Witnesses:
K. A. COSTELLO,
M. V. McGRATH.